United States Patent
Chen (10) Patent No.: US 8,204,257 B2
(45) Date of Patent: Jun. 19, 2012

(54) SYSTEM AND METHOD FOR INCREASING RING TONE VOLUME

(75) Inventor: Meng-Chun Chen, Tu-Cheng (TW)

(73) Assignee: Chi Mei Communications Systems, Inc., Tu-Cheng, New Taipei (TW)

( * ) Notice: Subject to any disclaimer, the term of this patent is extended or adjusted under 35 U.S.C. 154(b) by 1027 days.

(21) Appl. No.: 12/147,517

(22) Filed: Jun. 27, 2008

(65) Prior Publication Data

US 2009/0086997 A1   Apr. 2, 2009

(30) Foreign Application Priority Data

Sep. 28, 2007   (CN) .......................... 2007 1 0201884

(51) Int. Cl.
*H03G 3/00* (2006.01)

(52) U.S. Cl. .......... 381/107; 381/98; 381/101; 381/102; 381/103; 381/104; 379/372; 379/373.01; 379/374.01; 379/374.02; 379/375.01; 455/567; 700/94; 84/622; 84/659; 84/661; 84/735

(58) Field of Classification Search ................... 381/98, 381/101, 102, 103, 104, 107; 379/372, 373.01, 379/373.02, 373.03, 373.04, 374.01, 374.02; 455/567; 700/94; 84/622, 659, 661, 735
See application file for complete search history.

(56) References Cited

U.S. PATENT DOCUMENTS

| | | | |
|---|---|---|---|
| 5,191,607 A | 3/1993 | Meyers et al. | |
| 7,684,773 B2 * | 3/2010 | Kim | 455/183.2 |
| 2009/0047993 A1 * | 2/2009 | Vasa | 455/556.1 |

* cited by examiner

*Primary Examiner* — Kimberly Nguyen
*Assistant Examiner* — Mohammad T Karimy
(74) *Attorney, Agent, or Firm* — Altis Law Group, Inc.

(57) ABSTRACT

A method for increasing ring tone volume is provided. The method includes steps of: reading an audio file which is set as a current ring tone; determining whether the ring tone is a MP3 audio file or a musical instrument digital interface (MIDI) audio file; adjusting frequencies by using an equalizer technique to increase volume of the ring tone if the ring tone is the MP3 audio file; adjusting a volume level of the ring tone to be the highest volume level, and adjusting timbre of the ring tone to increase the ring tone volume by simulating a musical score of the ring tone by using different instruments if the ring tone is the MIDI audio file. A related system is also provided.

8 Claims, 8 Drawing Sheets

| Frequency | MIDI Pitch |
|---|---|
| 200Hz | 55 |
| 400Hz | 67 |
| 800Hz | 79 |
| 1000Hz | 83 |
| 2000 Hz | 95 |
| 3000 Hz | 102 |
| 4000 Hz | 107 |

FIG. 4

| Audio file ID | Measured volume |
|---|---|
| Cole | 92.9 dB(A) |
| Forest fire | 96.2 dB(A) |
| Forrest | 94.2 dB(A) |
| Gamlan | 94.9 dB(A) |
| Marame | 93.9 dB(A) |
| Obrigado | 93.8 dB(A) |
| Relax | 92.9 dB(A) |
| Sunbeam | 97 dB(A) |
| Sweet chariot | 88.1 dB(A) |
| Zen master | 91.2 dB(A) |

FIG. 5

| Audio file ID | Measured volume |
|---|---|
| Cole | 96.8 dB(A) |
| Forest fire | 95.8 dB(A) |
| Forrest | 96.7 dB(A) |
| Gamlan | 96.1 dB(A) |
| Marame | 96 dB(A) |
| Obrigado | 95.1 dB(A) |
| Relax | 97.7 dB(A) |
| Sunbeam | 97.6 dB(A) |
| Sweet chariot | 95 dB(A) |
| Zen master | 96.1 dB(A) |

SYSTEM AND METHOD FOR INCREASING RING TONE VOLUME

BACKGROUND

1. Field of the Invention

The present invention generally relates to a system and method for controlling volume, and particularly relates to a system and method for increasing the ring tone volume of a mobile phone.

2. Description of Related Art

It is well known that when a mobile phone receives a phone call, the mobile phone gives out a ring tone to notify the phone user of an incoming call.

Generally, ring tones are outputted by built-in speaker(s) of mobile phone. The ring tones may be MP3 audio files or musical instrument digital interface (MIDI) audio files. The MIDI audio files may be more suitable to be used as the ring tones, for mobile phones with limited memory, because MIDI audio files occupy relatively small memory space. However, because of the technique use in storing and reproducing MIDI files, the ring tone volume of MIDI audio files may not be as loud as the volume of the MP3 file. Generally, the volume of MP3 audio files is stronger/louder than the volume of the MIDI audio files for the same volume settings. However, ambient noise may prevent or hinder the ring tone of the mobile phones from being heard even if the ring tones are MP3 audio files. For example, in an environment where the ambient noise level is high the ring tones of the telephone may not be heard. Similarly, if the phone is placed in a pocket, briefcase, or purse, the ring tones may be muffled thereby suppressing the sound of the ring tones. In either scenario, the ring tones may not be heard, and the call may go unanswered.

In order to boost the volume, manufactures may add an amplifier to increase the ring tone volume. However, such method greatly increases the manufacturing cost of the mobile phones.

Accordingly, what is needed is a system and method for increasing ring tone volume by adjusting features of the ring tones.

SUMMARY

A system for increasing ring tone volume is provided. The system is integrated in a mobile phone, which includes an audio file identifying unit configured for identifying whether the ring tones are MP3 audio files or musical instrument digital interface (MIDI) audio files; a frequency adjusting unit configured for adjusting frequencies of the ring tones by using an equalizer technique to increase the ring tone volume if the ring tones are MP3 audio files; and a timbre adjusting unit configured for adjusting a volume level of the ring tones to be the highest volume level, and adjusting timbre of the ring tones to increase the ring tone volume by simulating a musical score of the ring tones by using different musical instruments, if the ring tones are MIDI audio files.

Other objects, advantages and novel features of the embodiments will be drawn from the following detailed description together with the attached drawings.

DETAILED DESCRIPTION OF THE EMBODIMENTS

Figure 1:
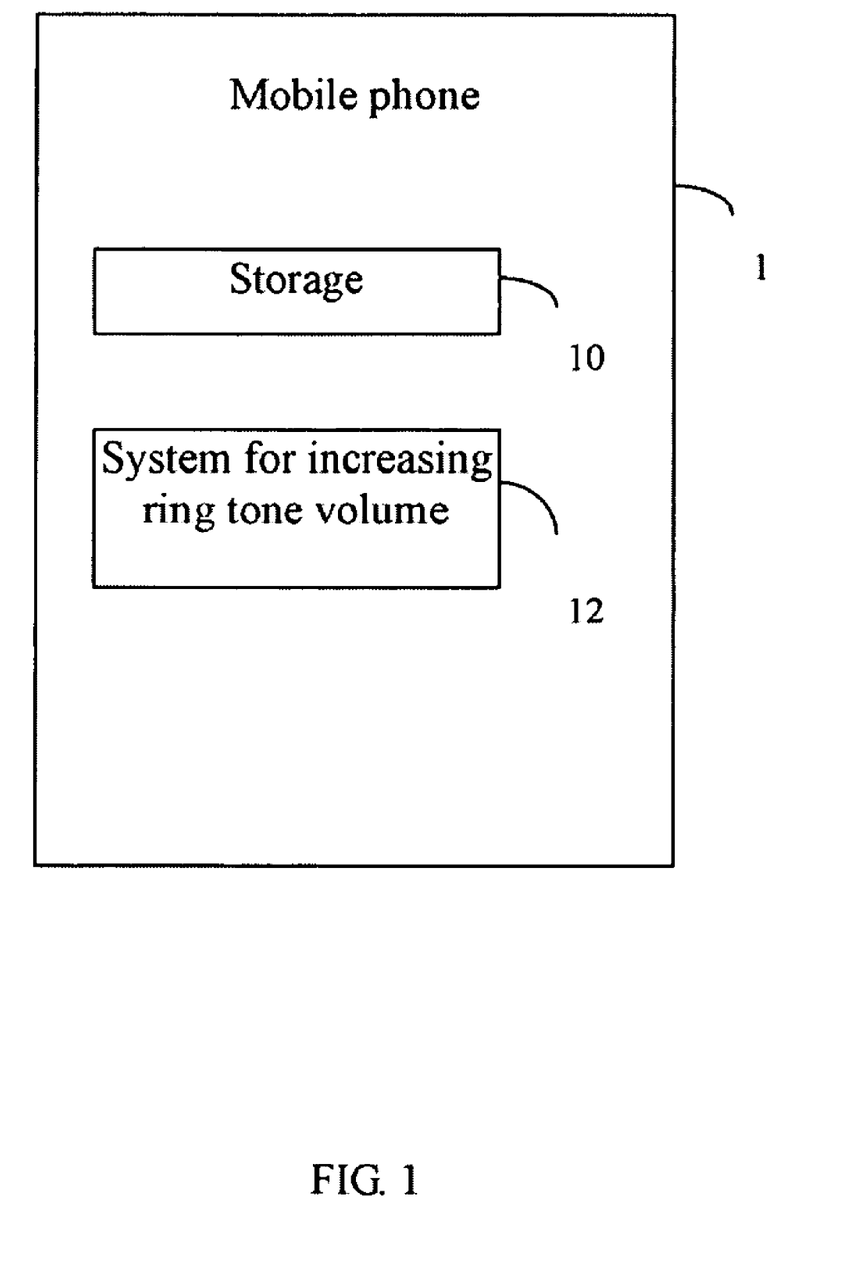
FIG. 1 is a block diagram of an application environment of a system for increasing ring tone volume in accordance with an exemplary embodiment.

FIG. 1 is an application environment of the exemplary embodiment of a system for increasing ring tone volume 12 (hereinafter, "the system 12") in accordance with an exemplary embodiment. The system 12 is integrated in a mobile phone 1. The mobile phone 1 includes a storage 10 for storing various kinds of data used or generated in utilizing the system. The storage 10 may be an internal memory card or an external memory card. In the exemplary embodiment, the data stored in the storage 10 may be audio files which can be set to be ring tones of the mobile phone 1.

The audio files may be MP3 audio files or musical instrument digital interface (MIDI) audio files. MIDI is a hardware specification and protocol used to communicate musical note and effect information between sound/music synthesizers, computers, music keyboards, controllers, and/or other electronic devices that may be used to play music. The MIDI audio file contains information that determines the instrument, musical note values, and the duration to be played by various instruments, but does not specify the actual sound output in terms of quality. It is simply a representation of the underlying music composition. The system 12 is configured for increasing the ring tone volume by adjusting features of the audio files in order to make the ring tone audible even in a noisy environment. The features of the audio files, that may be adjusted, may include, but not limited to, frequency, timbre and pitch.

Figure 2:
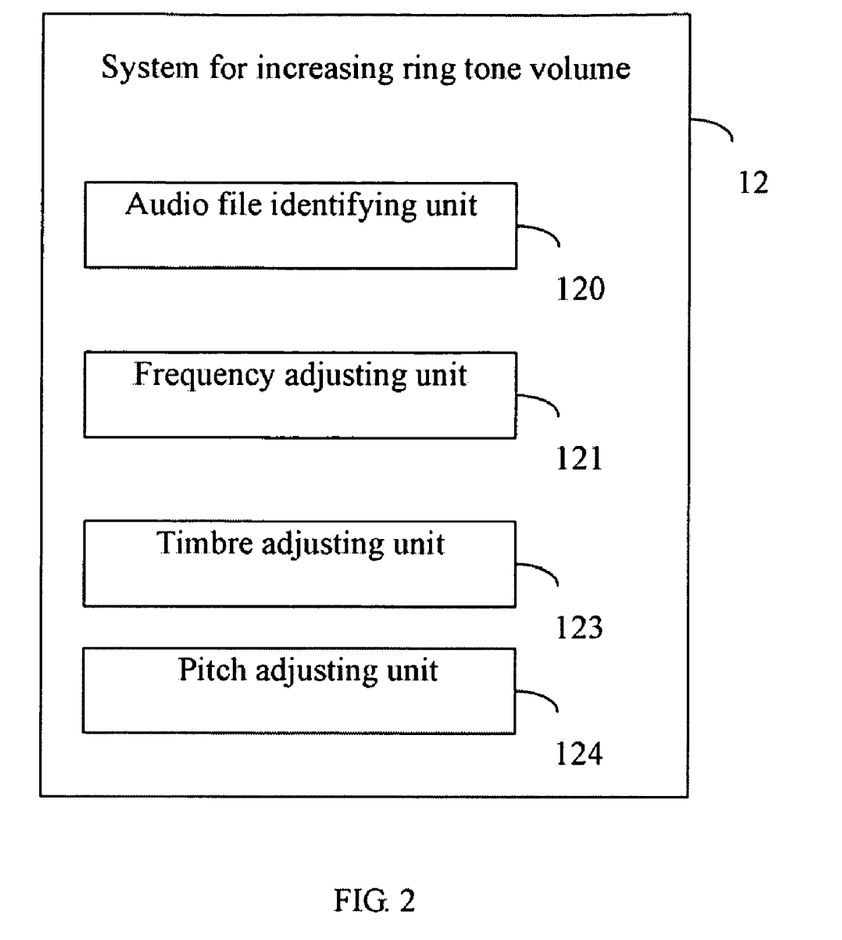
FIG. 2 is a block diagram of main function units of the system of FIG. 1.

FIG. 2 is a block diagram of the system 12. The system 12 includes an audio file identifying unit 120, a frequency adjusting unit 121, and a timbre adjusting unit 123.

The audio file identifying unit 120 is configured for identifying whether the ring tones of the mobile phone 1 are stored as MP3 audio files or MIDI audio files.

Figure 7:
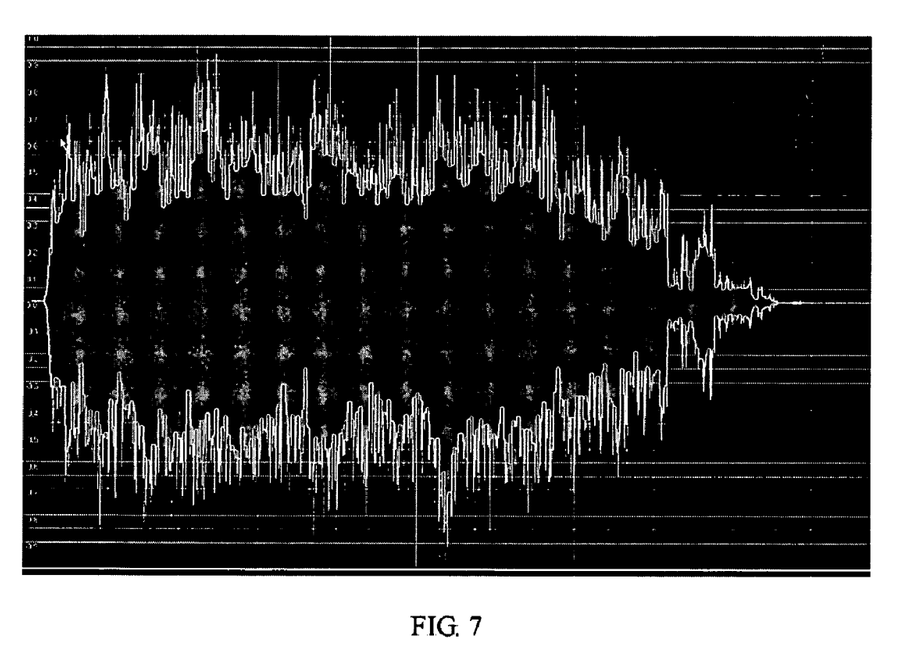
FIGS. 7 and 8 are printout of output of frequency curves before and after adjusting frequencies of the ring tones.
Figure 8:
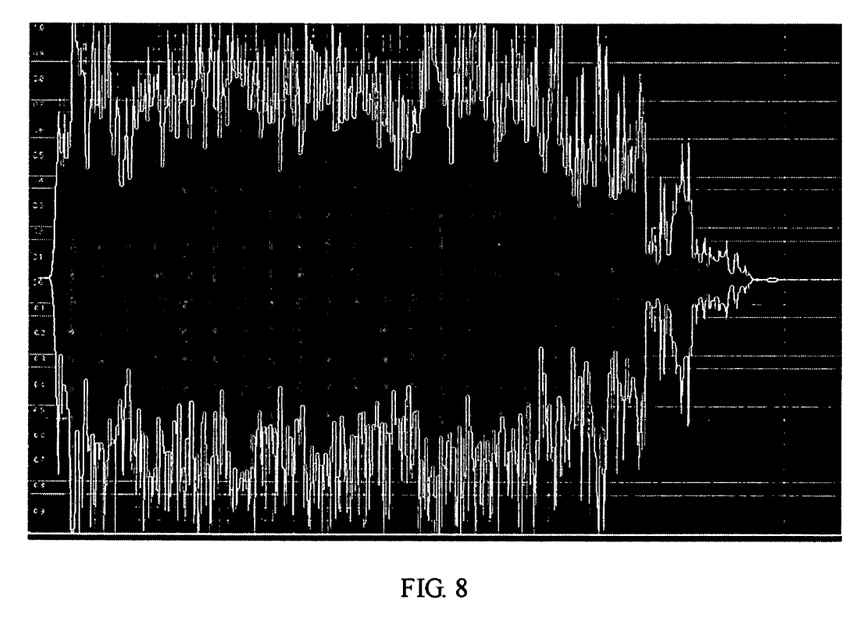

The frequency adjusting unit 121 is configured for adjusting the frequencies of the audio files to increase the ring tone volume by using an equalizer if the ring tones are stored as MP3 audio files. The equalizer is a device for increasing a sound field according to features of the audio files by amplifying a specified frequency value in a frequency domain. The equalizers may be classified into graphic equalizers or parametric equalizers based on their structure. The graphic equalizers have been used widely in audio file players such as MP3 players. Generally, sounds in a frequency range of 20 Hz~20 KHz are audible to human. Humans are more sensitivity to the higher end of the frequency range of the audible frequency range. FIG. 7 and FIG. 8 show a printout of the output of the volume of the ring tone before and after adjusting the frequencies of the audio files, respectively.

Figure 5:
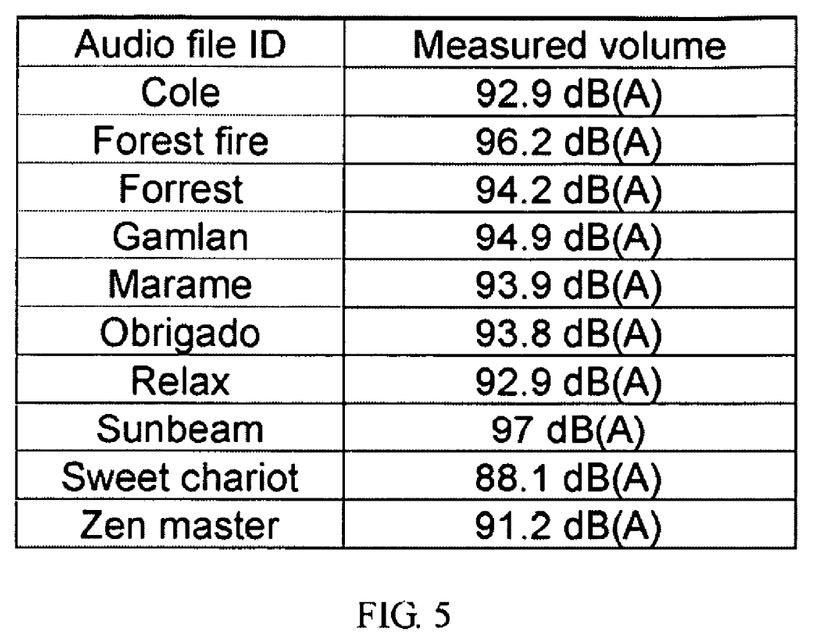
FIGS. 5 and 6 are a schematic diagram of measured volume before and after adjusting timbre of the audio files.
Figure 6:
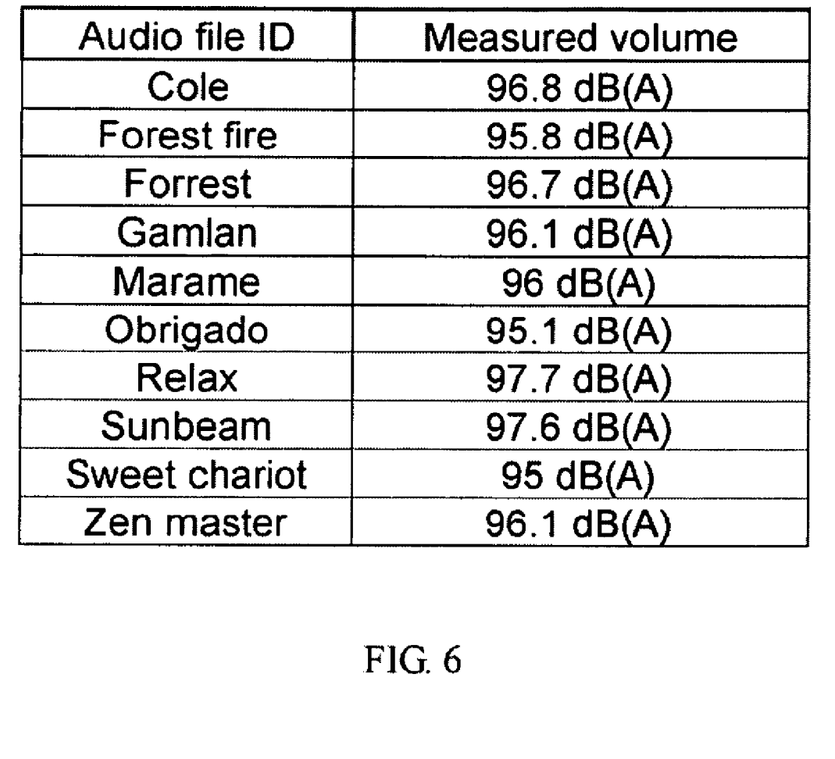

The timbre adjusting unit 123 is configured for adjusting a volume level of the ring tones to be the highest volume level, and adjusting the timbre of the audio files to increase the ring tone volume by simulating a musical score of the ring tones by using different musical instruments if the audio files are MIDI audio files. The volume levels of the MIDI audio files are expressed by numbers of 1~127. The number "1" represents the lowest volume level and the number "127" represents the highest volume level. For example, the timbre adjusting unit 123 may adjust the timbre of the audio files by using a violin to simulate Cello. Setting the volume level at 8, FIG. 5 shows a plurality of measured volumes of the MIDI audio files. FIG. 6 shows the volume level at 2 after adjusting the timbre of the audio files. As can be deduced, almost all of the Audio file measured volume, as shown in FIG. 6, exceeds the corresponding Audio file measured volume in FIG. 5.

Figure 4:
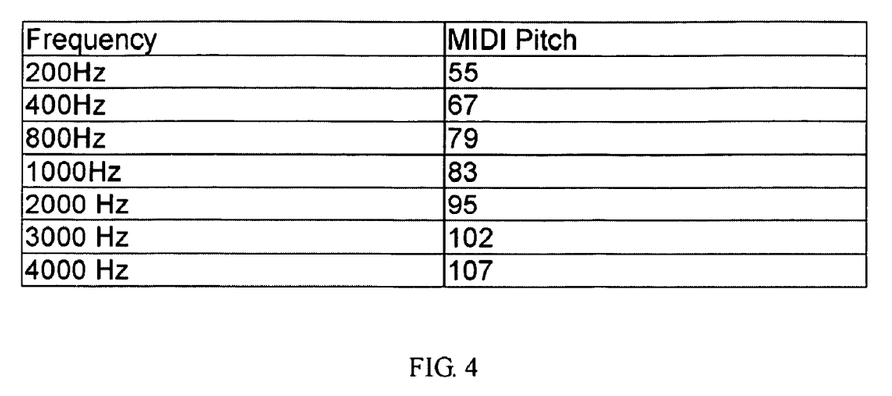
FIG. 4 is a schematic diagram illustrating corresponding relation between MIDI pitch and frequency of audio files.

The exemplary embodiment of the present invention may further include a pitch adjusting unit 124. The pitch adjusting unit 124 is configured for adjusting pitch of the MIDI audio files to increase the ring tone volume. In the exemplary embodiment, the pitch of the audio files may be adjusted within a range of 55~107 pitch unit as illustrated in FIG. 4. The pitch of the MIDI audio files within the range of 55~107 correspond to frequencies within a range of 200 Hz~4000 Hz because these frequencies are more sensitive to human ears.

Figure 3:
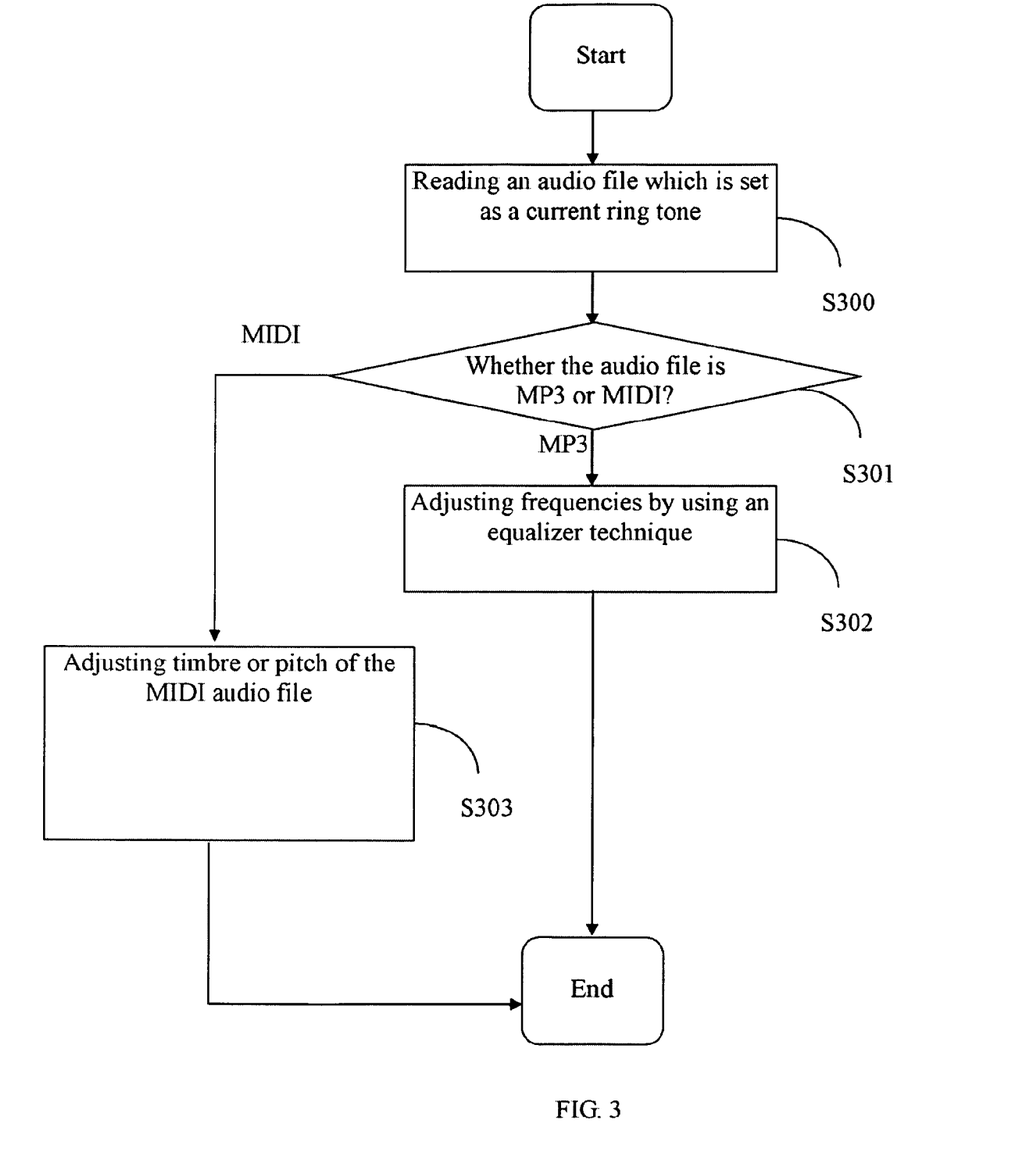
FIG. 3 is a flow chart of a exemplary method for increasing ring tone volume.

FIG. 3 is a flow chart of an exemplary method for increasing ring tone volume. In step S300, the audio file identifying unit 120 reads the audio file which is set as the current ring tone (hereinafter "the ring tone") of the mobile phone. The audio file may be the MP3 audio file or the MIDI audio file. In step S301, the audio file identifying unit 120 identifies whether the audio file is the MP3 audio file or the MIDI audio file. In step S302, if the audio file identifying unit 120 identifies that the ring tone is the MP3 audio file, the frequency adjusting unit 121 adjusting frequencies of the ring tone to increase the ring tone volume by using the equalizer technique.

Otherwise, in step S303, if the ring tone is MIDI audio file, the timbre adjusting unit 123 adjusts the volume level of the ring tone to be the highest level, and adjusts the timbre of the audio file to increase the ring tone volume by simulating a musical score of the ring tone by using different musical instruments. The volume levels of the MIDI audio files are expressed by numbers of 1~127. The number "1" represents the lowest volume level and the number "127" represents the highest volume level. For example, the timbre adjusting unit 123 may adjust the timbre of the audio files by using violin to simulate cello.

In another exemplary embodiment, in step S303, if the ring tones fall outside of the 200 Hz to 4 kHz frequency range the pitch may be adjusted correspondingly to fall within the 200 Hz to 4 kHz range because, as mentioned above, this range of frequencies are more sensitive to the human ear.

It should be emphasized that the above-described embodiments of the present invention, particularly, any "exemplary" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for increasing ring tone volume, the system integrated in a mobile phone, the system comprising:
    an audio file identifying unit configured for identifying whether the ring tones are MP3 audio files or musical instrument digital interface (MIDI) audio files;
    a frequency adjusting unit configured for adjusting frequencies of the ring tones by using an equalizer technique to increase the ring tone volume if the ring tones are MP3 audio files; and
    a timbre adjusting unit configured for adjusting a volume level of the ring tones to be the highest volume level, and adjusting a timbre of the ring tones to increase the ring tone volume by simulating a musical score of the ring tones by using different musical instruments, if the ring tones are MIDI audio files.

2. The system according to claim 1, wherein the system further includes a pitch adjusting unit configured for adjusting a pitch of the ring tones to be within 55~107 pitch to increase the ring tone volume if the ring tones are MIDI audio files.

3. The system according to claim 1, wherein the MIDI audio file contains information that determines instrument and the duration of note values to be played by various instruments.

4. The system according to claim 1, wherein the system further includes a pitch adjusting unit configured for adjusting a pitch of the ring tones to be within 55~107 pitch upon the condition that the ring tones are MIDI audio files and the ring tones fall outside of the 200 Hz to 4000 Hz frequency range.

5. A computer-based method for increasing ring tone volume, the method comprising the steps of:
    reading an audio file which is set as a current ring tone;
    determining whether the ring tone is a MP3 audio file or a musical instrument digital interface (MIDI) audio file;
    adjusting frequencies by using an equalizer technique to increase volume of the ring tone if the ring tone is the MP3 audio file;
    adjusting a volume level of the ring tone to be the highest volume level, and adjusting timbre of the ring tone to increase the ring tone volume by simulating a musical score of the ring tone by using different instruments if the ring tones is the MIDI audio file.

6. The method according to claim 5, wherein the MIDI audio file contains information that determines instrument and the duration of note values to be played by various instruments.

7. The method according to claim 5, further comprising:
    adjusting pitch of the ring tone to be within 55~107 pitch to increase the ring tone volume if the ring tone is the MIDI audio file.

8. The method according to claim 5, further comprising:
    adjusting a pitch of the ring tones to be within 55~107 pitch upon the condition that the ring tones are MIDI audio files and the ring tones fall outside of the 200 Hz to 4000 Hz frequency range.

* * * * *